US012725236B2

(12) United States Patent
Zhang et al.

(10) Patent No.: US 12,725,236 B2
(45) Date of Patent: Sep. 1, 2026

(54) LOW-LIGHT IMAGE ENHANCEMENT METHOD AND DEVICE BASED ON WAVELET TRANSFORM AND RETINEX-NET

(71) Applicant: NANJING UNIVERSITY OF POSTS AND TELECOMMUNICATIONS, Nanjing (CN)

(72) Inventors: Dengyin Zhang, Nanjing (CN); Yi Liu, Nanjing (CN)

( * ) Notice: Subject to any disclaimer, the term of this patent is extended or adjusted under 35 U.S.C. 154(b) by 289 days.

(21) Appl. No.: 18/668,791

(22) Filed: May 20, 2024

(65) Prior Publication Data

US 2025/0078230 A1 Mar. 6, 2025

(30) Foreign Application Priority Data

Aug. 28, 2023 (CN) ........................ 202311084703.2

(51) Int. Cl.
*G06T 5/94* (2024.01)
*G06T 5/60* (2024.01)
*G06T 5/70* (2024.01)

(52) U.S. Cl.
CPC .................. *G06T 5/94* (2024.01); *G06T 5/60* (2024.01); *G06T 5/70* (2024.01); *G06T 2207/10024* (2013.01); *G06T 2207/20064* (2013.01); *G06T 2207/20084* (2013.01)

(58) Field of Classification Search
CPC .... G06T 5/94; G06T 5/60; G06T 5/70; G06T 2207/10024; G06T 2207/20064; G06T 2207/20084
See application file for complete search history.

(56) References Cited

FOREIGN PATENT DOCUMENTS

| | | | | | |
|---|---|---|---|---|---|
| CN | 114862711 A | | 8/2022 | | |
| CN | 115035011 A | | 9/2022 | | |
| CN | 115358948 A | | 11/2022 | | |
| CN | 116228595 A | * | 6/2023 | ............... | G06T 5/00 |
| CN | 114897753 B | * | 8/2024 | ............... | G06T 5/70 |
| CN | 120634935 B | * | 10/2025 | ........... | G06T 7/0004 |

* cited by examiner

*Primary Examiner* — Pinalben Patel

(57) ABSTRACT

The present application discloses a low-light image enhancement method based on wavelet transform and Retinex-Net, and belongs to the field of image enhancement technology. In order to solve the problems of colour distortion and lack of details such as edges and textures when Retinex-Net processes some images, the present application adds the wavelet transform, fuses the high-frequency components with regional characteristics, and processes only the low-frequency component with Retinex-Net, to retain more details of edges and textures in the image, and transfers the low-frequency and high-frequency components from the HSV space to the value space for value fusion and stretching, to effectively improve the colour distortion of the image, and also improve the expression of details of the image. The present application retains more detail information while avoiding colour distortion, and the enhancement effect is satisfactory.

9 Claims, 3 Drawing Sheets

LOW-LIGHT IMAGE ENHANCEMENT METHOD AND DEVICE BASED ON WAVELET TRANSFORM AND RETINEX-NET

CROSS-REFERENCE TO RELATED APPLICATIONS

The present application claims priority to Chinese Patent Application No. 202311084703.2, filed Aug. 28, 2023, the entire disclosure of which is incorporated herein by reference.

TECHNICAL FIELD

The present application relates to a low-light image enhancement method and device based on wavelet transform and Retinex-Net, and belongs to the field of image enhancement technology in image processing.

BACKGROUND

Images, as a carrier of information transmission that stores, transmits, displays and analyses information, have gradually become an important means of communication, and the quality of the images is directly related to the amount of information that people can obtain. Remote sensing satellites, medical equipment, camera shots, surveillance cameras, etc. can all be used to obtain the desired image information. However, due to unavoidable environmental and technological limitations, such as insufficient light and limited exposure time, the images are often captured under sub-optimal lighting conditions. Interfered with by backlighting, non-uniform light, low light, multi-coloured light, etc., such images suffer from buried scene content, reduced contrast, strong noise and colour inaccuracies, and unsatisfactory information transfer for high-level tasks such as object tracking, recognition and detection. As a result, more and more researchers devote their efforts to the field of low-light image enhancement.

The traditional low-light image enhancement methods mainly include the methods based on histogram equalization, defogging, wavelet transform, and Retinex model. The wavelet transform method can better preserve the details of the image. The method using Retinex model decomposes the image into a reflection component and a illumination component, and the colour of the object depends on its ability to reflect light of different wavelengths, which is not affected by the light intensity. Although these methods are able to achieve low-light image enhancement to a certain extent, they are still poor in enhancement performance, speed, and accuracy, so deep learning based methods are proposed.

Deep learning based solutions offer better accuracy, robustness and speed compared to traditional methods. Deep learning methods based on Retinex enjoy better enhancement performance in most of the cases due to the physically interpretable Retinex theory. The Retinex-Net, a deep learning method based on Retinex theory, enhances the image by decomposing the low-light image into illumination and reflection components, which are then processed separately and fused to obtain the enhanced image. The luminance of the processed image is significantly improved, and the overall contour of the image is more obvious, but there are obvious colour distortion phenomenon and loss of certain edge detail information.

SUMMARY

The present application to provide a low-light image enhancement method and device based on wavelet transform and Retinex-Net, in order to solve the defects of the related art of having more obvious colour distortion phenomenon and lose of certain edge detail information.

A low-light image enhancement method based on wavelet transform and Retinex-Net, including:

- decomposing a to-be-processed image into a low-frequency component and a high-frequency component by using discrete wavelet transform;
- inputting the low-frequency component and the normal-light image into a decomposition network to obtain the illumination component and reflection component of the low-frequency component and the normal-light image respectively;
- denoising the reflection component of the low-frequency component to obtain a denoised reflection component;
- inputting the reflection component and the illumination component of the low-frequency component into an enhancement network to enhance the illumination component of the low-frequency component, to obtain an enhanced illumination component;
- multiplying the enhanced illumination component and the denoised reflection component element by element to obtain an enhanced low-frequency component, and transferring the enhanced low-frequency component from the RGB space to the HSV space to obtain a first hue component $H_1$, a first saturation component $S_1$, and a first value component $V_1$;
- fusing the high-frequency component of the to-be-processed image based on regional characteristics and transferring the fused high-frequency component image from the RGB space to the HSV space to obtain a second hue component $H_2$, a second saturation component $S_2$, and a second value component $V_2$;
- using a value fusion technology of the wavelet transform to fuse the first value component $V_1$ and the second value component $V_2$ to obtain a third luminance component V and stretching the third value component V to obtain a fourth value component V'; and
- using the wavelet inverse transform to fuse the first hue component $H_1$ and the second hue component $H_2$ into a third hue component H, and to fuse the first saturation component $S_1$ and the second saturation component $S_2$ into a third saturation component S, and reducing the third hue component H, the third saturation component S, and the fourth value component V' into the RGB space to obtain an enhanced image.

In one embodiment, a decomposition expression of the discrete wavelet transform is:

$$H_F(a_1, m, n) = \frac{1}{\sqrt{MN}} \sum_{i=0}^{M-1} \sum_{j=0}^{N-1} F(i, j)\overline{\varphi_{a_1 m,n}}(i, j)$$

$$H_F^u(a_2, m, n) = \frac{1}{\sqrt{MN}} \sum_{i=0}^{M-1} \sum_{j=0}^{N-1} F(i, j)\overline{\psi_{a_2,m,n}^u}(i, j),\ u = (H, V, D)$$

$H_F(a_1, m, n)$ is the low-frequency component of the to-be-processed image, $$H_F^u(a_2, m, n)$$

is the high-frequency component of the to-be-processed image including a horizontal high-frequency component H, a vertical high-frequency component V, and a diagonal high-frequency component D, $\overline{\varphi_{a_1,m,n}}(i, j)$ is a dual of the first discrete wavelet scale function $\varphi_{a_1,m,n}(i, j)$, $$\overline{\psi^u_{a_2,m,n}}(i, j)$$

is a dual of the second discrete wavelet scale function $$\psi^u_{a_2,m,n}(i, j)$$

in the horizontal, vertical, and diagonal directions, F is the to-be-processed image, MN is the pixel size of the to-be-processed image, $a_1$ is the initial function scale, and m, n are the discrete offsets.

In one embodiment, the inputting the reflection component and the illumination component of the low-frequency component into the enhancement network to enhance the illumination component of the low-frequency component, to obtain the enhanced illumination component includes:

- extracting features from the input image by using a 3×3 convolutional layer;
- sequentially mapping the extracted features by using five 3×3 convolutional layers with ReLU as the activation function;
- projecting R and I from a feature space by using a 3×3 convolutional layer after mapping;
- constraining R and I in the range [0, 1] by using a Sigmoid function to obtain the reflection component and the illumination component of the normal-light image and the reflection component and the illumination component of the low-frequency component of the low-light image.

In one embodiment, the enhancement network is an encoder-decoder architecture as a whole, including a plurality of up-sampling layers, convolutional layers and jump connections.

In one embodiment, the decomposition network includes a decomposition network loss function, and the decomposition network is trained by the decomposition network loss function, and the decomposition network loss function includes a reconstruction loss $L_{recon}$, a invariable reflectance loss $L_{ir}$, and a illumination smoothness loss $L_{is}$, and is specifically expressed as:

$$L = L_{recon} + \lambda_{ir} L_{ir} + \lambda_{is} L_{is}$$

$$L_{recon} = \sum_{i=low,normal} \sum_{j=low,normal} \lambda_{ij} \| R_i \circ I_j - S_j \|_1$$

$$L_{ir} = \| R_{low} - R_{normal} \|_1$$

$$L_{is} = \sum_{i=low,normal} \| \nabla I_i \circ \exp(-\lambda_g \nabla R_i) \|$$

where $\lambda_{ir}$ is a invariable reflectance coefficient, $\lambda_{is}$ is a illumination smoothness coefficient; $\nabla$ is a gradient, and $\lambda_g$ is a balanced structure-perceived intensity coefficient, when the weight is $\exp(-\lambda_g \nabla R_i)$, $L_{is}$ reduces constraints on the smoothness in a region of the reflection component of the normal light image with a large gradient.

In one embodiment, the enhancement network includes an enhancement network loss function, and the enhancement network is trained by the enhancement network loss function, the enhancement network loss function includes a reconstruction loss $L_{recon}$ and a illumination smoothness loss $L_{is}$, which is expressed as:

$$L = L_{recon} + \lambda_{is} L_{is}.$$

In one embodiment, a calculation formula for transferring a RGB component to a HSV component is expressed as:

$$V = M_{max}$$

$$S = \begin{cases} 0, & \text{if } M_{max} = 0 \\ \dfrac{M_{max} - N_{min}}{M_{max}} = 1 - \dfrac{N_{min}}{M_{max}}, & \text{otherwise} \end{cases}$$

$$H' = \begin{cases} 60 \times \dfrac{G - B}{M_{max} - N_{min}}, & \text{if } S \neq 0 \text{ and } M_{max} = R \\ 60 \times \left( \dfrac{B - R}{M_{max} - N_{min}} + 2 \right), & \text{if } S \neq 0 \text{ and } M_{max} = G \\ 60 \times \left( \dfrac{R - G}{M_{max} - N_{min}} + 4 \right), & \text{if } S \neq 0 \text{ and } M_{max} = B \end{cases}$$

$$H = \begin{cases} H', & \text{if } H' \geq 0 \\ H' + 360, & \text{otherwise} \end{cases}$$

H is the actual hue component, H' is the enhanced hue component, $M_{max}$ is the maximum value of the red component R, the green component G, and the blue component B, and $N_{min}$ is the minimum value of the red component R, the green component G, and the blue component B.

In one embodiment, the fusing the high-frequency component of the to-be-processed image based on regional characteristics is expressed as:

$$E_{A(m,n)} = \Sigma_{(m,n) \in w} DA^2(m, n)$$

$$E_{B(m,n)} = \Sigma_{(m,n) \in w} DB^2(m, n)$$

where D is the pixel value of the high-frequency component, w is the pixel range of the region around the pixel point (m, n), and E is the energy value in the pixel region;

$$E_{A(m,n)} > E_{B(m,n)}, \ A_h(m, n) = 1$$

$$E_{A(m,n)} \leq E_{B(m,n)}, \ B_h(m, n) = 1$$

in many pixel points in the pixel region, the matrix with the pixel value 1 appears only once, and the pixel point in the matrix has a maximum energy, in the calculation, the maximum energy is taken as a fusion coefficient, which is expressed as:

$$C_{a(m,n)} = \Sigma_{(m,n) \in w} A_h(m, n)$$

$$C_{b(m,n)} = \Sigma_{(m,n) \in w} B_h(m, n)$$

$$C_{a(m,n)} > C_{b(m,n)} R_h(m, n) = DA(m, n)$$

$$C_{a(m,n)} \leq C_{b(m,n)} R_h(m, n) = DB(m, n)$$

wherein $R_h$ is a fusion high frequency component.

In one embodiment, the using the value fusion technology of the wavelet transform to fuse the first value component $V_1$ and the second value component $V_2$ to obtain the third value component V and stretching the third value component V to obtain the fourth value component V', which is expressed as:

$$V = aV_1 + bV_2$$

two coefficients a and b are introduced, a+b=1, and the stretched value component is compared with an unprocessed value component to reflect a degree of value change, which is expressed as:

$$\gamma = \mu\frac{v'}{v}$$

γ is a value ratio, μ is the coefficient reflecting the proportionality relationship, the ratio of the value component is normalized, to obtain the value ratio reflecting the degree of image stretching, which is expressed as:

$$\gamma' = \frac{\gamma - \gamma_{min}}{\gamma_{max} - \gamma_{min}}$$

according to $$v' = \frac{\gamma' v'}{\mu},$$

the fourth value component V of the stretched image is obtained.

A low-light image enhancement device based on wavelet transform and Retinex-Net, including:

- a processing module, configured for decomposing a to-be-processed image into a low-frequency component and a high-frequency component by using the discrete wavelet transform;
- a decomposition module, configured for inputting the low-frequency component and the normal-light image into a decomposition network to obtain the illumination component and reflection component of the low-frequency component and the normal-light image respectively;
- a denoising module, configured for denoising the reflection component of the low-frequency component to obtain a denoised reflection component;
- an enhancement network module, configured for inputting the reflection component and the illumination component of the low-frequency component into an enhancement network to enhance the illumination component of the low-frequency component, to obtain an enhanced illumination component;
- a first extraction module, configured for multiplying the enhanced illumination component and the denoised reflection component element by element to obtain an enhanced low-frequency component, and transferring the enhanced low-frequency component from the RGB space to the HSV space to obtain a first hue component $H_1$, a first saturation component $S_1$, and a first value component $V_1$;
- a second extraction module, configured for fusing the high-frequency component of the to-be-processed image based on regional characteristics and transferring the fused high-frequency component from the RGB space to the HSV space to obtain a second hue component $H_2$, a second saturation component $S_2$, and a second value component $V_2$;
- a first fusion module, configured for using a value fusion technology of the wavelet transform to fuse the first value component $V_1$ and the second value component $V_2$ to obtain a third value component V and stretching the third value component V to obtain a fourth value component V'; and
- a second fusion module, configured for using the wavelet inverse transform to fuse the first hue component $H_1$ and the second hue component $H_2$ into a third hue component H, and to fuse the first saturation component $S_1$ and the second saturation component $S_2$ into a third saturation component S, and reducing the third hue component H, the third saturation component S, and the fourth value component V' into the RGB space to obtain an enhanced image.

Beneficial effects achieved by the present application compared with the related art:

The present application preserves more edge and texture details in the image by adding wavelet transform and fusing the high-frequency components with regional characteristics. Since the processed low-frequency and high-frequency components are transferred to the value space from the HSV space for luminance fusion and stretching, the colour distortion phenomenon of the image is effectively improved, and the expression of the details of the image is improved, and the problem of colour distortion and lack of details in Retinex-Net processing is solved, and the enhancement effect is very satisfactory.

DETAILED DESCRIPTION OF THE EMBODIMENTS

In order to make the technical means, the creative features, the purpose and the efficacy achieved by the present application easy to understand, the present application is further elaborated in the following with specific embodiments.

First Aspect

Figure 1:
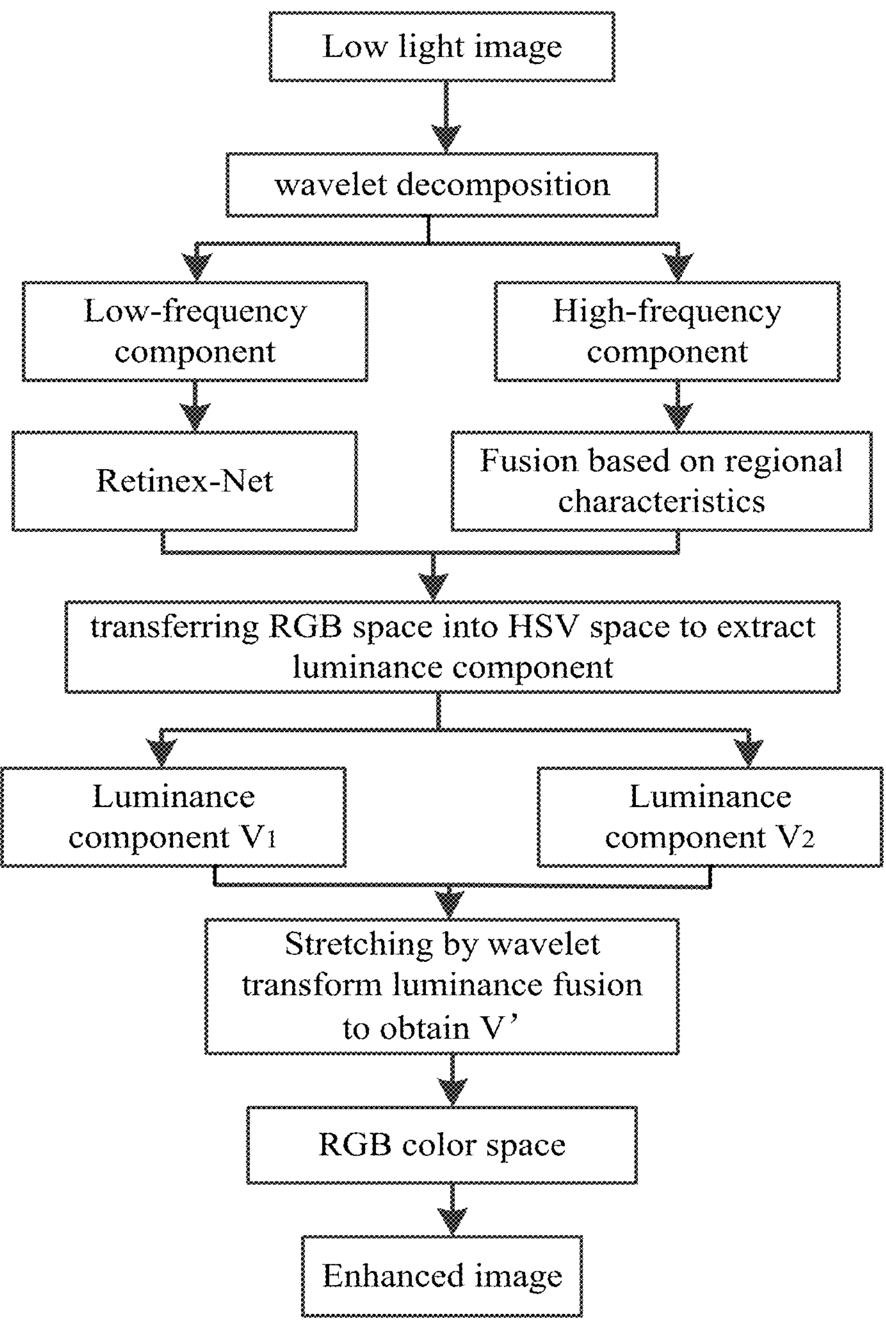
FIG. 1 is a schematic structure of the low-light image enhancement method combining the wavelet transform with Retinex-Net in the present application.
Figure 2:
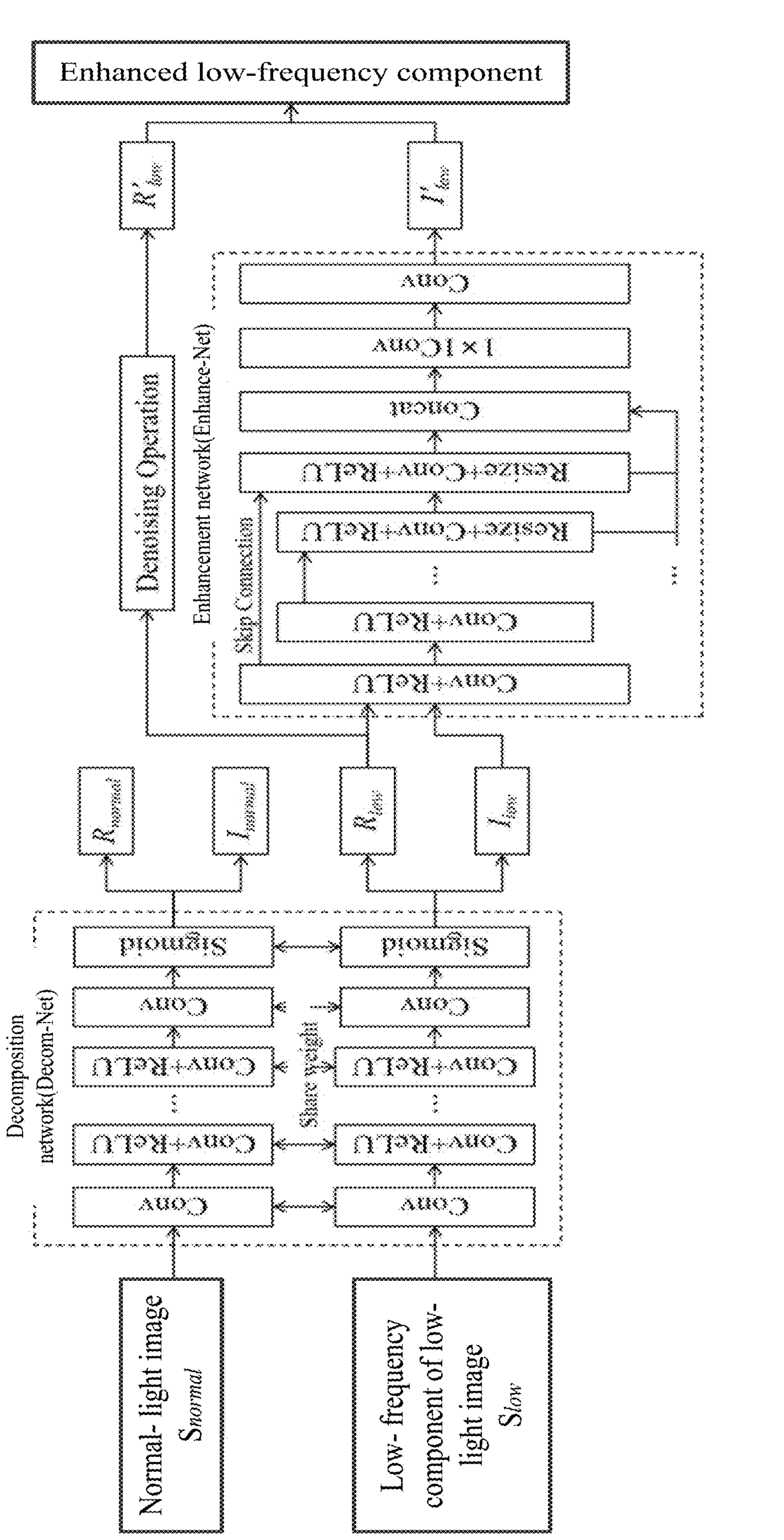
FIG. 2 is a schematic structure of the Retinex-Net in the present application.
Figure 3:
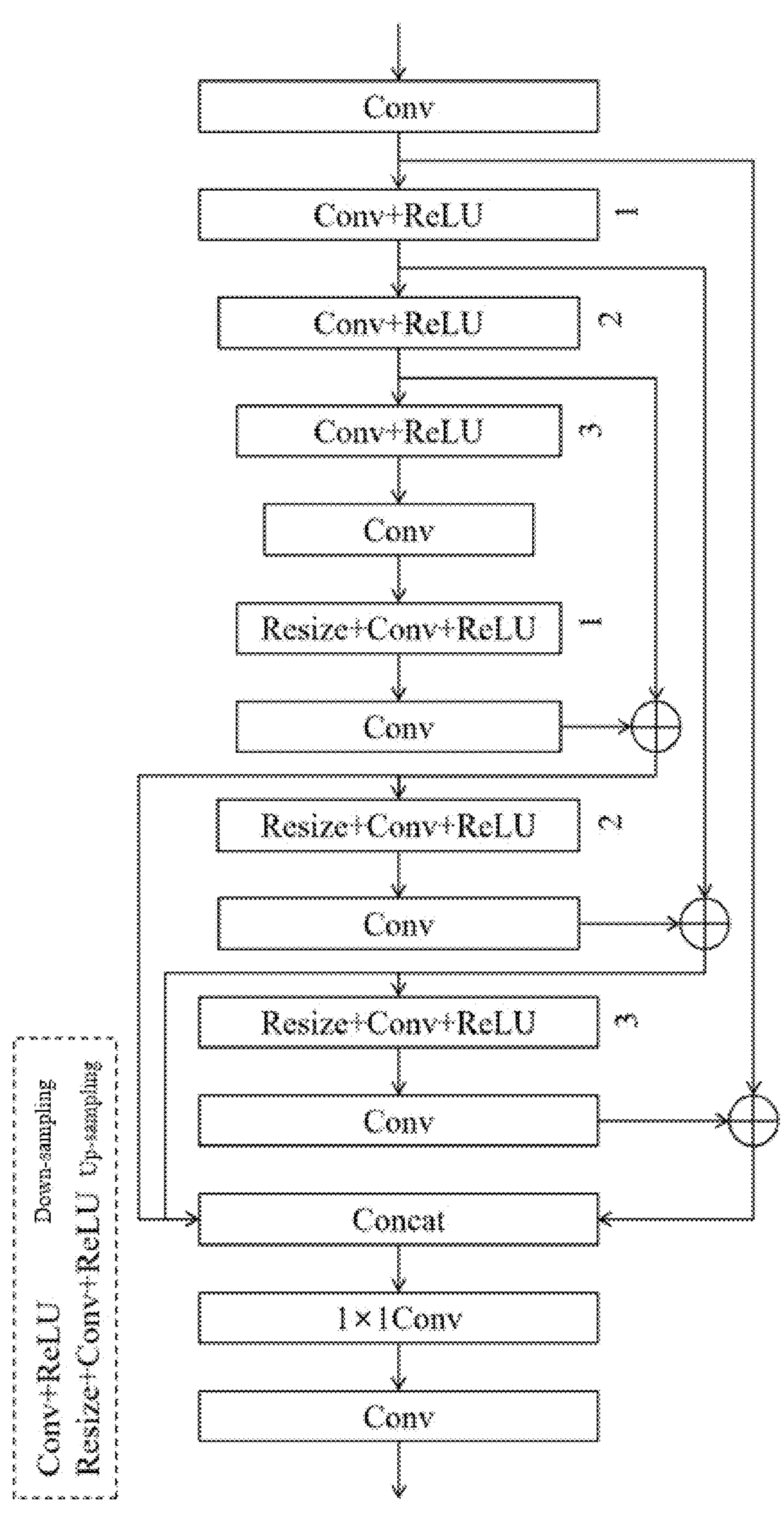
FIG. 3 is a schematic structure of the enhancement network in the present application.

As shown in FIGS. 1 to 3, the present application discloses a low-light image enhancement method based on wavelet transform and Retinex-Net, including:

- Step S1, decomposing a to-be-processed image into a low-frequency component and a high-frequency component by using discrete wavelet transform;
- Step S2, inputting the low-frequency component and the normal-light image into a decomposition network to obtain the illumination component and reflection component of the low-frequency component and the normal-light image respectively;
- Step S3, denoising the reflection component of the low-frequency component to obtain a denoised reflection component;
- Step S4, inputting the reflection component and the illumination component of the low-frequency component into an enhancement network to enhance the illumination component of the low-frequency component, to obtain an enhanced illumination component;

Step S5, multiplying the enhanced illumination component and the denoised reflection component element by element to obtain an enhanced low-frequency component, and transferring the enhanced low-frequency component from the RGB space to the HSV space to obtain a first hue component $H_1$, a first saturation component $S_1$, and a first value component $V_1$;

Step S6, fusing the high-frequency component of the to-be-processed image based on regional characteristics and transferring the fused high-frequency component from the RGB space to the HSV space to obtain a second hue component $H_2$, a second saturation component $S_2$, and a second value component $V_2$;

Step S7, using a value fusion technology of the wavelet transform to fuse the first value component $V_1$ and the second value component $V_2$ to obtain a third value component V and stretching the third value component V to obtain a fourth value component V'; and Step S8, using the wavelet inverse transform to fuse the first hue component $H_1$ and the second hue component $H_2$ into a third hue component H, and to fuse the first saturation component $S_1$ and the second saturation component $S_2$ into a third saturation component S, and reducing the third hue component H, the third saturation component S, and the fourth value component V' into the RGB space to obtain an enhanced image.

In the embodiment, in the step $S_1$, a decomposition expression of the discrete wavelet transform is:

$$H_F(a_1, m, n) = \frac{1}{\sqrt{MN}} \sum_{i=0}^{M-1} \sum_{j=0}^{N-1} F(i, j)\overline{\varphi_{a_1 m,n}}(i, j)$$

$$H_F^u(a_2, m, n) = \frac{1}{\sqrt{MN}} \sum_{i=0}^{M-1} \sum_{j=0}^{N-1} F(i, j)\overline{\psi_{a_2,m,n}^u}(i, j),\ u = (H, V, D)$$

$H_F(a_1, m, n)$ is the low-frequency component of the to-be-processed image, $$H_F^u(a_2, m, n)$$

is the high-frequency component of the to-be-processed image comprising a horizontal high-frequency component H, a vertical high-frequency component V, and a diagonal high-frequency component D, $\overline{\varphi_{a_1,m,n}}(i, j)$ is a dual of the first discrete wavelet scale function $$\varphi_{a_1,m,n}(i, j),\ \overline{\psi_{a_2,m,n}^u}(i, j)$$

is a dual of the second discrete wavelet scale function $$\psi_{a_2,m,n}^u(i, j)$$

in the horizontal, vertical, and diagonal directions, F is the to-be-processed image, MN is the pixel size of the to-be-processed image, a1 is the initial function scale, and m, n are the discrete offsets.

In the embodiment, in step S2, the inputting the reflection component and the illumination component of the low-frequency component into the enhancement network to enhance the illumination component of the low-frequency component, to obtain the enhanced illumination component comprises:

extracting features from the input image by using a 3×3 convolutional layer;

sequentially mapping the extracted features by using five 3×3 convolutional layers with ReLU as the activation function;

projecting R and I from a feature space by using a 3×3 convolutional layer after mapping;

constraining R and I in the range [0, 1] by using a Sigmoid function to obtain the reflection component and the illumination component of the normal-light image and the reflection component and the illumination component of the low-frequency component of the low-light image.

In the embodiment, in the step S3, in the embodiment of the present application, the network adjustment stage includes the denoising network of the reflection component and the enhancement network. In the step S3, the reflection component of the low-frequency component is denoised using BM3D. In the step S4, the reflection component and the illumination component of the low-frequency component are inputted into the enhancement network to enhance the illumination component of the low-frequency component. The enhancement network as a whole is an encoder-decoder architecture which includes a plurality of up-sampling layers, convolutional layers, and jump connections; and the specific process includes: firstly, a convolution layer with a convolutional kernel of 3×3 and a step size of 1 is used for feature extraction, and the extracted data is sequentially input into the first down-sampling layer, the second down-sampling layer and the third down-sampling layer, each down-sampling includes a convolutional layer with a step size of 2 and an activation function ReLU. The third down-sampling is processed by using a convolutional layer with a convolutional kernel of 3×3, and then three up-samplings are carried out. A convolutional layer with a convolutional kernel of 3×3 is used for processing after each up-sampling, and a convolutional layer with a convolutional kernel of 3×3 is used for processing after the first up-sampling and then is jump-connected with the output of the second down-sampling as the input of the second up-sampling, and the spliced data is used as the output of the first up-sampling, and so on, and a convolutional layer is used for processing after the second up-sampling, and then is jump-connected with the output of the first down-sampling as the input of the second up-sampling, and a convolutional layer is used for processing after the third up-sampling, and then is jump-connected with the output of the first down-sampling as the input of the third up-sampling. Each up-sampling layer uses resize-convolutional, i.e., the up-sampling layer includes a nearest-neighbour interpolation operation, and a convolutional layer with a step size of 1 and an activation function ReLU. The outputs of the first up-sampling, the second up-sampling and the third up-sampling are spliced, and the spliced data uses a 1×1 convolutional layer to reduce the cascade features to C channels, and finally a 3×3 convolutional layer is used to reconstruct the illumination component.

In the embodiment, the decomposition network includes a decomposition network loss function, and the decomposition network is trained by the decomposition network loss function, and the decomposition network loss function includes a reconstruction loss $L_{recon}$, a invariable reflectance loss $L_{ir}$, and a illumination smoothness loss $L_{is}$, and is specifically expressed as:

$$L = L_{recon} + \lambda_{ir} L_{ir} + \lambda_{is} L_{is}$$

$$L_{recon} = \sum_{i=low,normal} \sum_{j=low,normal} \lambda_{ij} \|R_i \circ I_j - S_j\|_1$$

$$L_{ir} = \|R_{low} - R_{normal}\|_1$$

$$L_{is} = \sum_{i=low,normal} \|\nabla I_i \circ \exp(-\lambda_g \nabla R_i)\|$$

$\lambda_{ir}$ is a invariable reflectance coefficient, $\lambda_{is}$ is a illumination smoothness coefficient; $\nabla$ is a gradient, and $\lambda_g$ is a balanced structure-perceived intensity coefficient, when the weight is $\exp(-\lambda_g \nabla R_i)$, $L_{is}$ reduces constraints on the smoothness in a region of the reflection component of the normal-light image with a large gradient, e.g. constraints the smoothness on where the image structure is more complex and the light is discontinuous, maintains the smoothness of the image structure, thus a clearer light image is obtained.

In the embodiment, the enhancement network includes an enhancement network loss function, and the enhancement network is trained by the enhancement network loss function, the enhancement network loss function comprises a reconstruction loss $L_{recon}$ and a illumination smoothness loss $L_{is}$, which is expressed as:

$$L = L_{recon} + \lambda_{is} L_{is}.$$

In one embodiment, a calculation formula for transferring a RGB component to a HSV component is expressed as:

$$V = M_{max}$$

$$S = \begin{cases} 0, & \text{if } M_{max} = 0 \\ \dfrac{M_{max} - N_{min}}{M_{max}} = 1 - \dfrac{N_{min}}{M_{max}}, & \text{otherwise} \end{cases}$$

$$H' = \begin{cases} 60 \times \dfrac{G - B}{M_{max} - N_{min}}, & \text{if } S \neq 0 \text{ and } M_{max} = R \\ 60 \times \left(\dfrac{B - R}{M_{max} - N_{min}} + 2\right), & \text{if } S \neq 0 \text{ and } M_{max} = G \\ 60 \times \left(\dfrac{R - G}{M_{max} - N_{min}} + 4\right), & \text{if } S \neq 0 \text{ and } M_{max} = B \end{cases}$$

$$H = \begin{cases} H', & \text{if } H' \geq 0 \\ H' + 360, & \text{otherwise} \end{cases}$$

H is the actual hue component, H' is the enhanced hue component, $M_{max}$ is the maximum value of the red component R, the green component G, and the blue component B, and $N_{min}$ is the minimum value of the red component R, the green component G, and the blue component B. After transferring to HSV space, the value and hue components of the image are relatively independent, and operations on the value component will not affect the proportionality of the original hue component, so the image colour can be better preserved.

In the embodiment, the high-frequency components of the to-be-processed image are fused based on regional characteristics in the step S6. The to-be-processed image is decomposed by wavelet decomposition to obtain three high-frequency components, and the high-frequency components contain image edges and texture details, and the current mainstream high-frequency fusion algorithm rule is to take the maximum value among the absolute values of all pixel points, which is too broad, and it is easy to mix the noise generated in the process of multi-scale decomposition in the high-frequency information, which will have an effect on the subsequent value stretching, and reduce the quality of the image. Therefore, it is proposed to add the extraction of local significant features in the process of high-frequency fusion, and the high-frequency components are fused according to the regional energy, which is expressed as follows:

the fusing the high-frequency component of the to-be-processed image based on regional characteristics is expressed as:

$$E_{A(m,n)} = \Sigma_{(m,n) \in w} DA^2(m, n)$$

$$E_{B(m,n)} = \Sigma_{(m,n) \in w} DB^2(m, n)$$

where D is the pixel value of the high-frequency component, w is the pixel range of the region around the pixel point (m, n), and E is the energy value in the pixel region;

$$E_{A(m,n)} > E_{B(m,n)},\ A_h(m, n) = 1$$

$$E_{A(m,n)} \leq E_{B(m,n)},\ B_h(m, n) = 1$$

In many pixel points in the pixel region, the matrix with the pixel value 1 appears only once, and the pixel point in the matrix has a maximum energy, in the calculation, the maximum energy is taken as a fusion coefficient, which is expressed as:

$$C_{a(m,n)} = \Sigma_{(m,n) \in w} A_h(m, n)$$

$$C_{b(m,n)} = \Sigma_{(m,n) \in w} B_h(m, n)$$

$$C_{a(m,n)} > C_{b(m,n)} R_h(m, n) = DA(m, n)$$

$$C_{a(m,n)} \leq C_{b(m,n)} R_h(m, n) = DB(m, n)$$

$R_h$ is a fusion high frequency component, the formulas above give the value of the maximum energy in the pixel region, which contains the most information and achieves the effect of enhancing details and uniformity of the image.

In the embodiment, the using the value fusion technology of the wavelet transform to fuse the first value component $V_1$ and the second value component $V_2$ to obtain the third value component V and stretching the third value component V to obtain the fourth value component V, which is expressed as:

$$V = aV_1 + bV_2$$

two coefficients a and b are introduced, a+b=1, the method can make the fusion effects of the fused value components most uniform, and the stretched value component is compared with an unprocessed value component to reflect a degree of value change, which is expressed as:

$$\gamma = \mu \frac{v'}{v}$$

$\gamma$ is a value ratio, $\mu$ is the coefficient reflecting the proportionality relationship, the ratio of the value component is normalized, to obtain the value ratio reflecting the degree of image stretching, which is expressed as:

$$\gamma' = \frac{\gamma - \gamma_{min}}{\gamma_{max} - \gamma_{min}}$$

according to $$v' = \frac{\gamma' v'}{\mu},$$

the fourth value component V' of the stretched image is obtained.

Second Aspect

The present application discloses a low-light image enhancement device based on wavelet transform and Retinex-Net, including:

a processing module, configured for decomposing a to-be-processed image into a low-frequency component and a high-frequency component by using the discrete wavelet transform;

a decomposition module, configured for inputting the low-frequency component and a normal-light image into a decomposition network to obtain the low-frequency component and a light component and a reflection component of the normal light image;

a denoising module, configured for denoising the reflection component of the low-frequency component to obtain a denoised reflection component;

an enhancement network module, configured for inputting the reflection component and the illumination component of the low-frequency component into an enhancement network to enhance the illumination component of the low-frequency component, to obtain an enhanced illumination component;

a first extraction module, configured for multiplying the enhanced illumination component and the denoised reflection component element by element to obtain an enhanced low-frequency component, and transferring the enhanced low-frequency component from the RGB space to the HSV space to obtain a first hue component $H_1$, a first saturation component $S_1$, and a first value component $V_1$;

a second extraction module, configured for fusing the high-frequency component of the to-be-processed image based on regional characteristics and transferring the fused high-frequency component from the RGB space to the HSV space to obtain a second hue component $H_2$, a second saturation component $S_2$, and a second value component $V_2$;

a first fusion module, configured for using a value fusion technology of the wavelet transform to fuse the first value component $V_1$ and the second value component $V_2$ to obtain a third value component V and stretching the third value component V to obtain a fourth value component V'; and a second fusion module, configured for using the wavelet inverse transform to fuse the first hue component $H_1$ and the second hue component $H_2$ into a third hue component H, and to fuse the first saturation component $S_1$ and the second saturation component $S_2$ into a third saturation component S, and reducing the third hue component H, the third saturation component S, and the fourth value component V' into the RGB space to obtain an enhanced image.

The foregoing is only a preferred embodiment of the present application, and it should be noted that, for those skilled in the art, a number of improvements and deformations may be made without departing from the technical principles of the present application, which shall also be regarded as the scope of the present application.

What is claimed is:

1. A low-light image enhancement method based on wavelet transform and Retinex-Net, comprising:

decomposing a to-be-processed image into a low-frequency component and a high-frequency component by using discrete wavelet transform;

inputting the low-frequency component and a normal light image into a decomposition network to obtain an illumination component and a reflection component of the low-frequency component and the normal-light image respectively, wherein the normal-light image is a normally-exposed image captured for a same scene, same object, and same lighting environment as the to-be-processed image;

denoising the reflection component of the low-frequency component to obtain a denoised reflection component;

inputting the reflection component and the illumination component of the low-frequency component into an enhancement network to enhance the illumination component of the low-frequency component, to obtain an enhanced illumination component;

multiplying the enhanced illumination component and the denoised reflection component element by element to obtain an enhanced low-frequency component, and transferring the enhanced low-frequency component from a RGB space to a HSV space to obtain a first hue component $H_1$, a first saturation component $S_1$, and a first value component $V_1$;

fusing the high-frequency component of the to-be-processed image based on regional characteristics and transferring the fused high-frequency component from the RGB space to the HSV space to obtain a second hue component $H_2$, a second saturation component $S_2$, and a second value component $V_2$;

using a value fusion technology of the wavelet transform to fuse the first value component $V_1$ and the second value component $V_2$ to obtain a third value component V and stretching the third value component V to obtain a fourth value component V'; and using a wavelet inverse transform to fuse the first hue component $H_1$ and the second hue component $H_2$ into a third hue component H, and to fuse the first saturation component $S_1$ and the second saturation component $S_2$ into a third saturation component S, and reducing the third hue component H, the third saturation component S, and the fourth value component V' into the RGB space to obtain an enhanced image.

2. The low-light image enhancement method based on wavelet transform and Retinex-Net according to claim 1, wherein a decomposition expression of the discrete wavelet transform is:

$$H_F(a_1, m, n) = \frac{1}{\sqrt{MN}} \sum_{i=0}^{M-1} \sum_{j=0}^{N-1} F(i, j)\overline{\varphi_{a_1 m,n}}(i, j)$$

-continued $$H_F^u(a_2, m, n) = \frac{1}{\sqrt{MN}} \sum_{i=0}^{M-1} \sum_{j=0}^{N-1} F(i, j) \overline{\psi_{a_2 m,n}^u}(i, j),\ u = (H, V, D)$$

wherein $H_F(a_1, m, n)$ is the low-frequency component of the to-be-processed image, $$H_F^u(a_2, m, n)$$

is the high-frequency component of the to-be-processed image comprising a horizontal high-frequency component H, a vertical high-frequency component V, and a diagonal high-frequency component D, $\overline{\varphi_{a_1,m,n}}(i, j)$ is a dual of a first discrete wavelet scale function $\varphi_{a_1, m, n}(i, j)$, $$\psi_{a_2,m,n}^U(i, j)$$

is a dual of a second discrete wavelet scale function $$\psi_{a_2,m,n}^u(i, j)$$

in the horizontal, vertical, and diagonal directions, F is the to-be-processed image, MN is a pixel size of the to-be-processed image, a is an initial function scale, and m, n are the discrete offsets.

3. The low-light image enhancement method based on wavelet transform and Retinex-Net according to claim 1, wherein the inputting the reflection component and the illumination component of the low-frequency component into the enhancement network to enhance the illumination component of the low-frequency component, to obtain the enhanced illumination component comprises:

extracting features from an input image by using a 3×3 convolutional layer;

sequentially mapping the extracted features by using five 3×3 convolutional layers with ReLU as an activation function;

projecting R and I from a feature space by using a 3×3 convolutional layer after mapping;

constraining R and I in the range [0, 1] by using a Sigmoid function to obtain the reflection component and the illumination component of the normal-light image and the reflection component and the illumination component of the low-frequency component of the low-light image.

4. The low-light image enhancement method based on wavelet transform and Retinex-Net according to claim 1, wherein the enhancement network is an encoder-decoder architecture as a whole, comprising a plurality of up-sampling layers, convolutional layers and jump connections.

5. The low-light image enhancement method based on wavelet transform and Retinex-Net according to claim 1, wherein the decomposition network comprises a decomposition network loss function, and the decomposition network is trained by the decomposition network loss function, and the decomposition network loss function comprises a reconstruction loss $L_{recon}$, a invariable reflectance loss $L_{ir}$, and a illumination smoothness loss $L_{is}$, and is specifically expressed as:

$$L = L_{recon} + \lambda_{ir} L_{ir} + \lambda_{is} L_{is}$$

$$L_{recon} = \sum_{i=low,normal} \sum_{j=low,normal} \lambda_{ij} \| R_i \cdot I_j - S_j \|_1$$

$$L_{ir} = \| R_{low} - R_{normal} \|_1$$

$$L_{is} = \sum_{i=low,normal} \| \nabla I_i \cdot \exp(-\lambda_g \nabla R_i \|$$

wherein $\lambda_{ir}$ is a invariable reflectance coefficient, $\lambda_{is}$ a illumination smoothness coefficient; ∇ is a gradient, and $\lambda_g$ is a balanced structure-perceived intensity coefficient, when the weight is $\exp(-\lambda_g \nabla R_i)$, $L_{is}$ reduces constraints on the smoothness in a region of the reflection component of the normal-light image with a large gradient.

6. The low-light image enhancement method based on wavelet transform and Retinex-Net according to claim 1, wherein the enhancement network comprises an enhancement network loss function, and the enhancement network is trained by the enhancement network loss function, the enhancement network loss function comprises a reconstruction loss $L_{recon}$ and a illumination smoothness loss $L_{is}$, which is expressed as:

$$L = L_{recon} + \lambda_{is} L_{is}.$$

7. The low-light image enhancement method based on wavelet transform and Retinex-Net according to claim 1, wherein a calculation formula for transferring a RGB component to a HSV component is expressed as:

$$V = M_{max}$$

$$S = \begin{cases} 0, \text{ if } M_{max} = 0 \\ \frac{M_{max} - N_{min}}{M_{max}} = 1 - \frac{N_{min}}{M_{max}}, \text{ otherwise} \end{cases}$$

$$H' = \begin{cases} 60 \times \frac{G - B}{M_{max} - N_{min}}, \text{ if } S \neq 0 \text{ and } M_{max} = R \\ 60 \times \left( \frac{B - R}{M_{max} - N_{min}} + 2 \right), \text{ if } S \neq 0 \text{ and } M_{max} = G \\ 60 \times \left( \frac{R - G}{M_{max} - N_{min}} + 4 \right), \text{ if } S \neq 0 \text{ and } M_{max} = B \end{cases}$$

$$H = \begin{cases} H', \text{ if } H' \geq 0 \\ H' + 360, \text{ otherwise} \end{cases}$$

wherein H is the actual hue component, H' is the enhanced hue component, $M_{max}$ is the maximum value of the red component R, the green component G, and the blue component B, and $N_{min}$ is the minimum value of the red component R, the green component G, and the blue component B.

8. The low-light image enhancement method based on wavelet transform and Retinex-Net according to claim 1, wherein the fusing the high-frequency component of the to-be-processed image based on regional characteristics is expressed as:

$$E_{A(m, n)} = \Sigma_{(m, n) \in w} DA^2(m, n)$$

$$E_{B(m, n)} = \Sigma_{(m, n) \in w} DB^2(m, n)$$

where D is the pixel value of the high-frequency component, w is the pixel range of the region around the pixel point (m, n), and E is the energy value in the pixel region;

$$E_{A(m,n)} > E_{B(m,n)},\ A_h(m, n) = 1$$

$$E_{A(m,n)} \le E_{B(m,n)},\ B_h(m, n) = 1$$

wherein in many pixel points in the pixel region, the matrix with the pixel value 1 appears only once, and the pixel point in the matrix has a maximum energy, in the calculation, the maximum energy is taken as a fusion coefficient, which is expressed as:

$$C_{a(m,\ n)}=\Sigma_{(m,\ n)\in w}A_h(m,\ n)$$

$$C_{b(m,\ n)}=\Sigma_{(m,\ n)\in w}B_h(m,\ n)$$

$$C_{a(m,n)} > C_{b(m,n)} R_h(m, n) = DA(m, n)$$

$$C_{a(m,n)} \le C_{b(m,n)} R_h(m, n) = DB(m, n)$$

wherein $R_h$ is a fusion high frequency component.

9. The low-light image enhancement method based on wavelet transform and Retinex-Net according to claim 1, wherein the using the value fusion technology of the wavelet transform to fuse the first value component $V_1$and the second value component $V_2$ to obtain the third value component V and stretching the third value component V to obtain the fourth value component V', which is expressed as:

$$V = aV_1 + bV_2$$

wherein two coefficients a and b are introduced, a+b=1, and the stretched value component is compared with an unprocessed value component to reflect a degree of value change, which is expressed as:

$$\gamma = \mu\frac{v'}{v}$$

wherein y is a value ratio, μ is the coefficient reflecting the proportionality relationship, the ratio of the value component is normalized, to obtain the value ratio reflecting the degree of image stretching, which is expressed as:

$$\gamma' = \frac{\gamma - \gamma_{min}}{\gamma_{max} - \gamma_{min}}$$

according to $$v' = \frac{\gamma' v'}{\mu},$$

the fourth value component V' of the stretched image is obtained.

* * * * *